United States Patent [19]

Martin et al.

[11] Patent Number: 5,302,254

[45] Date of Patent: Apr. 12, 1994

[54] PROCESS AND PLANT FOR THE THERMOLYSIS OF INDUSTRIAL AND/OR URBAN WASTE

[75] Inventors: Gerard Martin, Rueil Malmaison; Robert Gaulard, Sussy En Brie, both of France

[73] Assignee: Institut Francais Du Petrole, Rueil Malmaison Cedex, France

[21] Appl. No.: 911,033

[22] Filed: Jul. 9, 1992

[30] Foreign Application Priority Data

Jul. 9, 1991 [FR] France ............................ 91 08718

[51] Int. Cl.⁵ .................... C10B 47/00; C10B 53/00
[52] U.S. Cl. ............................... 201/21; 201/15; 201/17; 201/20; 201/25; 201/27; 201/41; 202/105; 202/226; 202/150
[58] Field of Search ............. 201/15, 17, 3, 20, 21, 201/25, 27, 29, 37, 41; 202/99, 226, 105, 150

[56] References Cited

U.S. PATENT DOCUMENTS

| | | | |
|---|---|---|---|
| 2,687,992 | 8/1954 | Leffer | 201/37 |
| 3,862,887 | 1/1975 | Brelski et al. | 201/25 |
| 4,303,477 | 12/1981 | Schmidt et al. | 201/25 |
| 4,329,202 | 5/1982 | White et al. | 201/27 |
| 4,445,976 | 5/1984 | LaDelfa et al. | 201/41 |

FOREIGN PATENT DOCUMENTS 3606144 7/1987 Fed. Rep. of Germany ........ 201/20

*Primary Examiner*—Joye L. Woodard
*Attorney, Agent, or Firm*—Antonelli, Terry, Stout & Kraus

[57] ABSTRACT

A plant for treating industrial and/or urban waste includes a stage for drying of the waste, followed by a stage for effecting thermolysis of the dried waste and a stage for effecting recovery of the solids and gases resulting from the thermolysis. Thermolysis of the waste is effected in a reactor by indirect heat exchange with combustion gases and drying gases for drying of the waste are subsequently treated to remove vapor materials and then recycled to a gas generator for generating the drying gases. Additionally the plant includes a stage for effecting dechlorination of the solids resulting from the thermolysis by washing the solids with an aqueous liquid, as well as a stage of separating the wash solids and the resulting wash liquid.

14 Claims, 1 Drawing Sheet

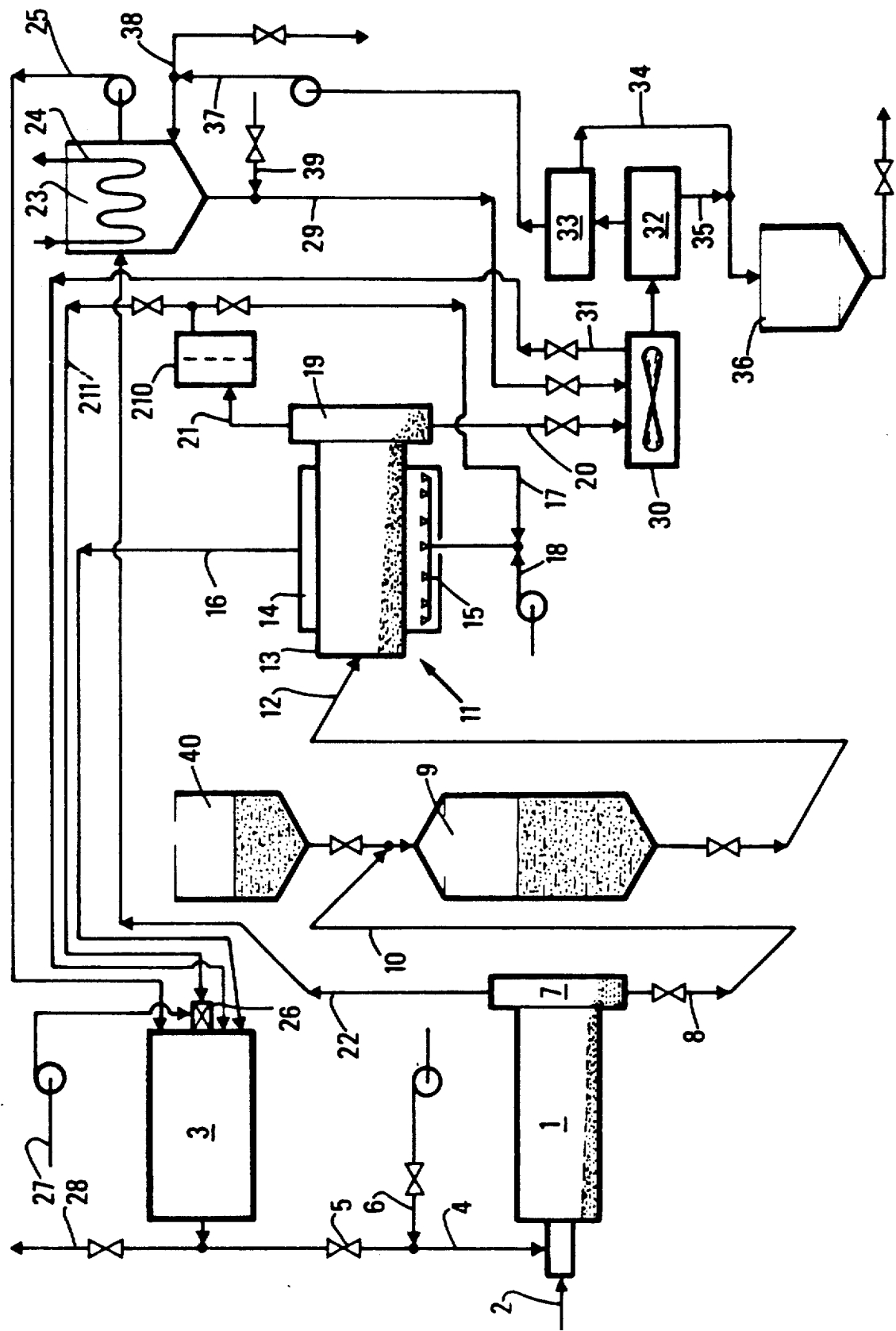

PROCESS AND PLANT FOR THE THERMOLYSIS OF INDUSTRIAL AND/OR URBAN WASTE

BACKGROUND OF THE INVENTION

The present invention relates to the field of treatment of industrial and/or urban waste and more specifically to the thermolysis or pyrolysis of such waste.

Pyrolysis is a chemical decomposition of a body obtained by heating under absence of oxygen, whereas thermolysis is a decomposition obtained under the effect of a variation in temperature. These two terms thus define operations closely related to one another; this is the reason why they will be used equally hereafter.

Treating industrial and/or urban waste is notably important for the environment. The thermal treatment which has been most used in the past years is waste incineration, but the methods applied often pose problems, either at the level of the volume of solid product to be stocked, or at the level of the quality of the discharge.

As for the quality of the discharged products, several waste treatment plants have already been proposed in order to dispose of most of the pollutants, and notably heavy metals, chlorine, sulfur . . . in the gaseous effluents discharged as well as in the solid products generated by incineration.

A well-known technique disclosed in U.S. Pat. No. 4,303,477 consists in injecting in several places of a waste treatment circuit a basic powder for removing the heavy metals, sulfur dioxide or halogenated compounds from the combustion gases.

The applicant has proposed, in French patent application FR-2,668,774, a process and a plant for treating combustible waste according to which the waste is subjected to a pyrolysis operation. In order to produce, at the outlet of this plant, fuels as clean and valorizable as possible, the effluents resulting from the pyrolysis operation are subjected to a hot and dry treatment (that is without washing).

Besides, French patent application FR-2,654,112 describes a process and a plant for treating urban waste and implementing a thermolysis operation performed after a particular drying of the waste. Moreover, the tars initially present in the thermolysis gases are extracted from the thermolysis gases so as to allow these gases to be re-used later in the course of the process.

There are also other techniques recommending other types of treatments for the effluents and/or the particles resulting from the pyrolysis (or thermolysis) of the waste, but these post-treatments are generally either complex, and therefore costly, or little effective.

SUMMARY OF THE INVENTION

The object of the present invention is a process and a plant for treating urban and/or industrial waste of the type defined above and whose improvements consist in:

treating very heterogeneous industrial and urban waste comprising large quantities of elements such as heavy metals or some heteroatoms such as chlorine, fluorine, sulfur, etc, without any discharge of noxious and polluting substances towards the outside;

developing the most part of the energy contained in the waste in the form of a coke cleared of the major part of the pollutants it contains, easy to stock and usable later in conventional plants for burning solid fuels;

using at best the potential of recovery of the basic mineral products contained in the waste. In fact, the temperature range selected for performing the thermolysis of the waste allows the polluting heteroatoms to be easily collected by the alkaline and alkaline earth, compounds that accompany the waste;

discharging into the atmosphere combustion gases used for the process, cleared of polluting substances;

treating the drying effluents so as to remove all the malodorous products and the light gasolines;

obtaining a fuel whose calorific power is much higher than that of the treated waste;

discharging towards the outside weakly chloride-laden clean waters.

These objects can be obtained through a waste treatment process comprising notably a waste drying stage, followed by a thermolysis stage, the solids and the gases resulting from the thermolysis being recovered and/or treated.

Drying the waste is achieved by direct contact of the waste with warm gases. The drying gases are treated and then partly recycled in the plant. During the thermolysis operation, the waste is not in contact with the fumes resulting from the combustion of part of the gases generated by the thermolysis.

The invention is implemented under the conditions stated above. More specifically, the solids resulting from the thermolysis are subjected to a dechlorination by washing, then a first stage of separation between the solids washed thereby and the wash liquid is achieved.

The solids treated thereby can thereafter be stocked or used in a heat generator adjacent to the thermolysis unit.

The process according to the invention may also comprise a second stage of separation of the particles contained in the wash liquid already filtered, and the wash liquid which has been subjected to the second filtering is partly re-used for said dechlorination by washing.

The first separation stage preferably also consists in extracting the non-combustible inert compounds contained in the solids generated during the thermolysis stage.

The warm gases used for drying the waste advantageously come from a generator in which the combustion/heating gases used for the thermolysis, the treated drying gases and the light organic compounds resulting from the dechlorination stage are injected. The burner of said generator is notably supplied with air and by another part of the gases generated by the thermolysis.

Besides, only part of the warm fumes coming from the generator is used for drying the waste, the other part being re-used for another purpose in the plant, for example for pre-heating the combustion air of the generator itself.

The object of the invention is also a plant for treating industrial and/or urban waste, comprising notably:

a means for drying the waste, a means for the thermolysis of the waste, a means (3) for generating warm fumes at least partly intended for the drying means.

More precisely, the plant further comprises a means for collecting and dechlorinating by washing the products coming from the thermolysis means, the thermolysis means comprising two distinct enclosures allowing the heating gases to be separated from the waste, and the thermolysis means is supplied with part of the effluents resulting from the thermolysis.

Besides, the plant also comprises at least one first separator located downstream from said washing means, the solid particles separated in said separator being then collected in a storage means, and the purified wash liquid being re-injected into the circuit supplying said washing means.

Without departing from the scope of the invention, said first separator may also comprise a means for separating the combustible solids from the non-combustible inert solids.

BRIEF DESCRIPTION OF THE DRAWING

Other features and advantages of the present invention will be clear from reading the description hereafter given by way of non limitative example, with reference to the single accompanying drawing.

DESCRIPTION OF THE PREFERRED EMBODIMENTS

The moist waste is sent through line 2 towards a drier 1 such as, for example, a revolving drum of substantially horizontal axis.

The waste is contacted, inside drier 1, with warm fumes delivered through a line 4 and coming from a heat generator 3.

The delivery of the warm fumes may be regulated for example by a shutter valve or shutter 5. Besides, a cold air inlet 6, also modulable, can be provided on line 4 delivering the warm fumes.

The waste is stirred, mixed with the warm air inside drying drum 1 and progresses in the same direction as the warm air towards an extraction zone 7 of course located at the end opposite the inlet.

The dried and dehydrated waste is delivered from drier 1 towards an intermediate hopper 9 through a line 8. An elevator 10 may be provided on line 8 for problems linked to the bulk clearance of the plant.

Similarly, intermediate storage hopper 9 is not always necessary. If a basic agent must be added to the waste, a specific hopper 40 may then be provided at this level so as to inject the basic compound into the dry waste before the thermolysis thereof.

Adding a basic agent may be envisaged when the basic potential of the mineral products supplied by the waste is not sufficient for all the polluting elements present in the waste to be collected.

After this possible injection, the dried waste is introduced through a line 12 into thermolysis reactor 11. The reactor preferably consists of a perfectly sealed inner cylindric jacket 13 in which the waste progresses longitudinally. This jacket 13 rotates around its longitudinal axis which axis is slightly inclined so as to, facilitate the delivery of the solids by gravity towards a separator 19. An outer jacket 14 surrounds inner jacket 13, and provides a substantially annular space for the heating gases surrounding jacket 13. One or several burners 15 located, for example, in the annular space, below jacket 13, provide the temperature rise and maintenance of heat for thermolysis of the waste present in jacket 13.

The combustion gases produced by burners 15 are discharged through a line 16 and sent, for example, towards the heat generator 3.

The fuel used by burners 15 consists of a fraction of the gases produced in thermolysis reactor 11, and is delivered through a specific line 17 from the upper part of extractor-separator 19 located at the outlet of thermolysis reactor 11. The combustion air is delivered through another line 18.

In extractor 19, the solids coming out of jacket 13 are extracted by gravity through a line 20, at a temperature close to the final thermolysis temperature ranging between 200° and 700° C., preferably between 350° and 500° C.

In order to trap the acid residual compounds present in the thermolysis effluents, such as chlorine, fluorine, etc, a device 210 for the dry trapping of these compounds may be preferably provided on effluent discharge pipe 21, near extractor 19. The temperature maintenance of this device 210 may be provided by electric resistors (not shown), so as to avoid a temperature fall of the thermolysis gases.

Downstream from device 210, a fraction of the thermolysis effluents is sent towards burners 15. The other part of the gases resulting from the thermolysis is reserved for the generating of warm gases to dry the waste. These thermolysis gases are thus delivered through a pipe 211 into warm fumes generator 3. More precisely, these thermolysis effluents supply the burner (s) 26 of generator 3, the combustion air being for example delivered through another pipe 27.

Warm gases coming from drier 1 may also be introduced into heat generator 3. The drying gases preferably leave drier 1 through a specific line 22 and pass through a condenser 23 equipped with a refrigeration circuit 24. The steam is condensed thereby, the light gasolines remaining in the gas phase. At the outlet of condenser 23, a line 25 allows the dry drying gases and the light gasolines to flow towards generator 3. These effluents, as well as the fumes generated by the burners, are thus introduced into generator 3 where they add to the warm fumes produced by burner 26. This incineration allows any unburned organic matter to be removed.

At the outlet of generator 3, the temperature of the warm gases is at least 850° C., the residence time in generator 3 being at least 2 seconds.

It is possible, under certain working conditions, that all the warm gases produced by generator 3 are not injected into drier 1. In this case, the other part of the warm fumes is discharged separately through a line 28 and may be used in other zones of the plant. These fumes may be used in particular for pre-heating the combustion air of generator 3.

In a characteristic feature according to the invention, the solids coming from thermolysis reactor 11 and discharged through line 20 are contacted with a washing agent such as water for example, in a tank 30 called a "wash tank".

The water and/or any other washing agent is preferably delivered through a pipe 29 coming from condenser 23. Besides, tank 30 may be equipped with stirring means (not referenced), so as to improve the contacting of the water and of the thermolysis solids.

The object of this washing of the thermolysis solids is to remove the chlorides contained therein. The temperature of the water in tank 30, that is after contacting with the solids, ranges between 20° and 100° C., preferably between 50° and 90° C. Moreover, wash tank 30 may be compartmented, so as to achieve a more effective washing. For example, the wash water and the solids to be treated can have a counterflow circulation in the compartments, so as to increase the dechlorination efficiency and to decrease the amount of wash water. Warming up the wash water is preferably achieved automatically, by means of the sensible heat provided by the warm solids.

A vaporization of the light organic compounds dissolved in the water during the condensation stage occurs in tank 30. These compounds are discharged through a pipe 31 leading them towards generator 3 where they will be burned.

The dechlorinated solids-water mixture is transferred from tank 30 towards a first separator 32 for separating the solid and the liquid phases, where the depolluted particles are discharged through a line 35 before being stocked in a specific device (hopper) 36.

Another separation may be advantageously performed in the first separator 32. The non combustible inert compounds (such as glass, metals, . . . ) are to be distinguished from the coke by gravity difference. Without departing from the scope of the invention, the separation of the inert compounds can be achieved by flotation during the washing.

Besides, the wash liquid coming out of the first separator 32 can be cleared of the finest particles thereof in a second separator 33. The fine solid particles recovered at this place are discharged through a line 34 and join solid discharge line 35.

The chloride-laden wash liquid is discharged from the second separator 33 through a line 37 and is preferably directed towards condenser 23. A water evacuation can be provided from line 37, according to the ratio of chlorides present in the wash water.

On the other hand, if required for the dissolution of the chlorides contained in the solids resulting from the thermolysis, additional water can be supplied, for example at the level of line 29 supplying wash tank 30 with water. A specific line 39 opens then in line 29.

Of course, valves, shutters or any other devices known in themselves may be provided on the various pipes of the plant in accordance with the invention so as to regulate the various flow rates, that is to adapt the plant to the volume and/or to the composition of the waste to be treated.

Some of these regulation devices are shown in the accompanying drawing. The man skilled in the art will be able to add or to remove some without departing from the scope of the invention. Similarly, measuring devices such as pressure, temperature or flow rate sensors (not shown) can be provided in various places of the plant for control purposes.

An improved treatment of waste highly contaminated by pollutants can thus be achieved from the plant described above and from the associated process.

Thus, waste containing notably heavy metals, chlorine, fluorine, sulfur in high proportions can be treated in the plant without causing emissions prejudicial to the environment.

The gaseous effluents produced by the plant (through line 28 for example) no longer contain acid compounds such as hydrochloric acid, hydrofluoric acid or sulfur oxides, etc, or any unburned or toxic organic compound, all these pollutants have been removed by incineration and/or by washing and/or by chemical reaction.

The waters used for washing the solids resulting from the thermolysis only contain chlorides and contain no organic matter. These waters thus allow a very effective dechlorination of the solids, so that the coke generated thereby will produce no hydrochloric acid during a further combustion.

Moreover, the coke has an improved calorific power owing to the removal of almost all the non combustible inert solids at the level of the first separator 32.

The coke produced contains the major part of the heavy metals which can be removed in a controlled way during a further combustion.

Of course, the man skilled in the art will be able to conceive, from the plant and the process which have been described by way of a non-limitative example, different variants and/or modifications without departing from the scope of the invention.

We claim:

1. A process for treating industrial and/or urban waste, which comprises drying the waste in a drier supplied with warm drying gases produced in a gas generator; effecting thermolysis of the dried waste by indirect heating in a reactor with combustion gases; and treating solids and gases resulting from the thermolysis, the drying gases being treated to remove water vapor and then recycled to the gas generator for supplying the warm drying gases to said drier; effecting dechlorination of the solids resulting from the thermolysis by washing the solids with an aqueous liquid; effecting separation between the washed solids and the resulting wash liquid; and injecting the combustion gases used for heating the thermolysis reactor, the treated drying gases and light organic compounds resulting from the dechlorination of the solids into said gas generator and supplying a burner of said gas generator with a portion of the gases resulting from the thermolysis as fuel.

2. A process as claimed in claim 1, further comprising effecting additional treatment of the wash liquid to separate particles of solids contained in the wash liquid, said wash liquid, subjected to an additional separation treatment being recycled to a wash tank containing the solids resulting from the thermolysis to effect dechlorination.

3. A process as claimed in claim 2, wherein the additional separation also comprises a step of extracting non-combustible inert compounds contained in the solids generated by thermolysis.

4. A process as claimed in claim 1, wherein one part of the warm gases coming from the gas generator is used for drying the waste and another part of the warm gases is used for preheating combustion air introduced into the burner of said gas generator.

5. A process as claimed in claim 1, wherein drying of the waste is effected by passing the warm gases cocurrently with the waste so that the gases and the waste travel in the same direction within said drier.

6. A process as claimed in claim 1, wherein treatment of the drying gases comprises effecting condensation of steam and effecting separation of vapors of light gasolines, said process further comprising injecting said vapors of light gasolines into said gas generator.

7. A process as claimed in claim 1, wherein the gases generated by the thermolysis reactor pass into a device for trapping acid residual compounds before the generated gases are introduced into the gas generator.

8. A process as claimed in claim 1, further comprising admixing a basic agent with the dried waste before effecting thermolysis in said reactor.

9. A process as claimed in claim 1, wherein the thermolysis is performed between 200° and 700° C.

10. A process as claimed in claim 1, wherein the temperature at an outlet for the warm gases discharged from said gas generator is at least 850° C. and the residence time of gases within said gas generator is at least two seconds.

11. A plant for treating industrial and/or urban waste, which comprises a drier for drying the waste with warm gases; a reactor for effecting thermolysis of the dried waste; a gas generator for generating the warm gases and means for supplying the warm gases into said drier; and means for washing solid products discharged from the thermolysis reactor, said thermolysis reactor comprising two distinct enclosures, one enclosure for containing heating gases and the other enclosure for containing the waste; means for supplying a part of the gaseous effluents resulting from the thermolysis to a burner for generating the heating gases for said reactor, at least one first separator arranged to receive effluents from said washing means, solid particles separated in said first separator thereafter being collected in a storage means, means for treating the wash liquid and means for re-injecting the treated wash liquid into a conduit for supplying liquid to said washing means; said gas generator further comprising at least one inlet for combustion gases coming from the thermolysis reactor, one inlet for purified gases coming from the drier and one inlet for gaseous organic compounds coming from the washing means, said gas generator having a burner which is supplied with effluent gases resulting from thermolysis of said waste.

12. A plant as claimed in claim 11, further comprising a second separator located after said at least one first separator for receiving wash liquid from the at least one first separator and for separating fine particles contained in the wash liquid, said second separator comprising an outlet for discharging of the fine particles.

13. A plant as claimed in claim 11, further comprising a device for trapping acids present in gases produced by the thermolysis reactor, said device being located in an outlet of the thermolysis reactor.

14. A plant as claimed in claim 11, further comprising means, located between the drier and the thermolysis reactor, for injecting a basic agent into the waste.

* * * * *